United States Patent
Lee et al.

(10) Patent No.: US 9,656,605 B1
(45) Date of Patent: May 23, 2017

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Kang Ho Lee, Incheon (KR); Hyerim Baek, Yongin-si (KR); Heon Jae Lim, Suwon-si (KR); JungJun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/132,999

(22) Filed: Apr. 19, 2016

(30) Foreign Application Priority Data

Nov. 26, 2015 (KR) .......................... 10-2015-0166016

(51) Int. Cl.
| | | |
|---|---|---|
| *G06F 17/00* | (2006.01) | |
| *B60Q 9/00* | (2006.01) | |
| *E05B 81/70* | (2014.01) | |
| *F16H 61/02* | (2006.01) | |
| *F16H 59/50* | (2006.01) | |

(52) U.S. Cl.
CPC ................ *B60Q 9/00* (2013.01); *E05B 81/70* (2013.01); *F16H 59/50* (2013.01); *F16H 61/0204* (2013.01)

(58) Field of Classification Search
CPC ....... B60Q 9/00; E05B 81/70; F16H 61/0204; F16H 59/50
See application file for complete search history.

(56) References Cited

U.S. PATENT DOCUMENTS

| | | | | |
|---|---|---|---|---|
| 3,381,269 A | * | 4/1968 | Fierbaugh ................ | B60Q 9/00 340/456 |
| 4,967,182 A | * | 10/1990 | Foster .................... | B60Q 9/001 200/81 H |
| 8,044,788 B2 | * | 10/2011 | Lundgren ............... | B60T 17/22 340/453 |
| 2003/0075981 A1 | * | 4/2003 | Chen ..................... | B60Q 9/001 307/10.1 |
| 2012/0154136 A1 | * | 6/2012 | Connelly, Jr. ........... | B60Q 9/00 340/457 |

(Continued)

FOREIGN PATENT DOCUMENTS

| | | |
|---|---|---|
| JP | H06-156163 A | 6/1994 |
| JP | H0920157 A | 1/1997 |

(Continued)

*Primary Examiner* — David J Hlavka
(74) *Attorney, Agent, or Firm* — McDermott Will & Emery LLP

(57) ABSTRACT

A vehicle includes a power detector for detecting a power state of the vehicle, a transmission detector for detecting a transmission mode of the vehicle, a door detector for detecting a door state of the vehicle, and a processor for generating an inadvertent ignition warning by comparing the power state, the transmission mode and the door state with an inadvertent ignition reference, for generating an inadvertent ignition level according to the accumulation of the generated inadvertent ignition warning, and for providing an inadvertent ignition warning message corresponding to the generated inadvertent ignition level.

18 Claims, 10 Drawing Sheets

(56) References Cited

U.S. PATENT DOCUMENTS

2013/0271276 A1* 10/2013 Okada ................. F02N 11/0814
340/441

FOREIGN PATENT DOCUMENTS

| JP | H11-245682 A | 9/1999 |
| JP | 2012-111301 A | 6/2012 |
| KR | 20-0134317 Y1 | 2/1999 |
| KR | 10-2002-0053108 A | 7/2002 |

* cited by examiner

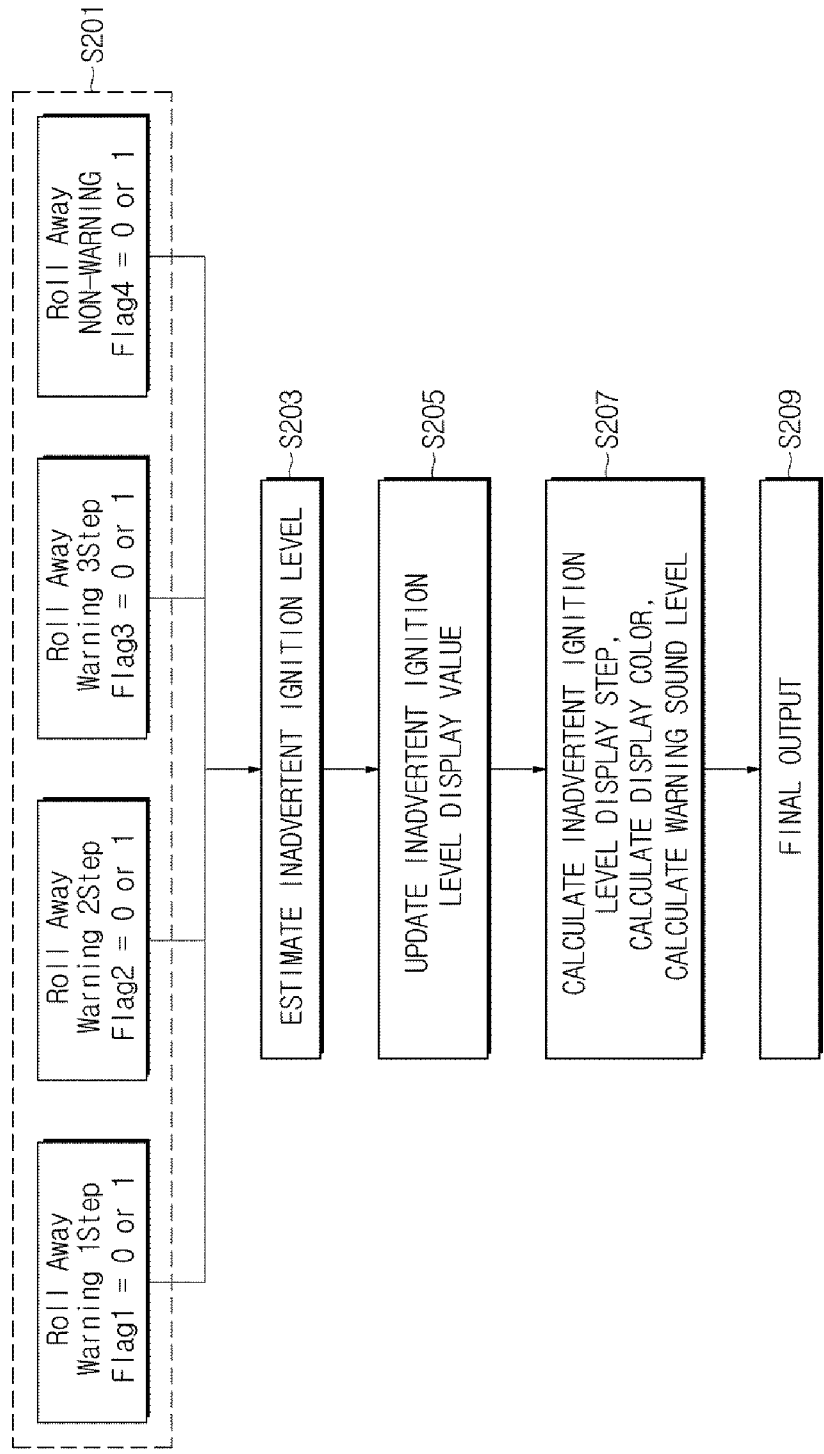

VEHICLE AND CONTROL METHOD THEREOF

CROSS-REFERENCE TO RELATED APPLICATION(S)

This application claims the benefit of priority to Korean Patent Application No. 10-2015-0166016, filed on Nov. 26, 2015 with the Korean Intellectual Property Office, the disclosure of which is incorporated herein by reference.

TECHNICAL FIELD

Embodiments of the present disclosure relate to a vehicle and a control method thereof, and further relate to the generation of an inadvertent ignition warning.

BACKGROUND

A variety of vehicle safety devices have been developed and mounted to a vehicle related to a driver's convenience and safety.

Particularly, a vehicle safety device may include a safety auxiliary device, such as lane departure warning system configured to prevent a vehicle from departing from a driving lane by helping the steering operation of the driver when the vehicle is driven on the road, an additional service device such as a navigation system configured to guide a route to a destination. The navigation system may be implemented by an Audio Video Navigation (AVN) device configured to provide an audio and a video function, e.g. music, movie, radio, as well as route guidance information.

To provide more a pleasant environment to a driver, a variety of technologies, e.g. those reducing engine noise, may be applied to the vehicle. In addition, instead of a key insert method, an ignition button method may be applied to the vehicle as a method for the ignition.

However, the reduction of engine noise and the ignition button method may cause difficulties for a driver in recognizing that the ignition is turned on or turned off, and thus the driver may leave the vehicle without turning off the ignition.

SUMMARY

Therefore, it is an aspect of the present disclosure to provide a vehicle capable of improving the safety of the driver by providing an integrated management and notification of generating an inadvertent ignition warning generated when the vehicle is in a movable state (roll away state), and a control method of the vehicle.

Additional aspects of the present disclosure will be set forth in part in the description which follows and, in part, will be obvious from the description, or may be learned by practice of the present disclosure.

In accordance with one aspect of the present disclosure, a vehicle includes a power detector for detecting a power state of the vehicle; a transmission detector for detecting a transmission mode of the vehicle; a door detector for detecting a door state of the vehicle; and a processor configured to generate an inadvertent ignition warning by comparing the power state, the transmission mode and the door state with an inadvertent ignition reference, configured to generate an inadvertent ignition level according to the accumulation of the generated inadvertent ignition warning, and configured to provide an inadvertent ignition warning message corresponding to the generated inadvertent ignition level.

The processor may generate the inadvertent ignition level by applying a weight value corresponding to a cumulative number of the inadvertent ignition warnings.

The processor may generate the inadvertent ignition level by applying a weight value corresponding to the type of the inadvertent ignition warning.

The processor may decrease an inadvertent ignition level by applying a negative (−) weight value when an inadvertent ignition warning is not generated until an ignition power state is switched to OFF after an ignition power state detected by the power detector is switched to ON.

The processor may output the inadvertent ignition warning message including an inadvertent ignition pattern when the inadvertent ignition level exceeds a reference level.

The processor may output the inadvertent ignition warning guiding the transmission mode to be switched to a parking state, when the power state is an accessory power state, the transmission mode is a non-parking state, and the door state is an open state.

The processor may output the inadvertent ignition warning guiding the power state to be switched to an ignition power OFF state, when the power state is an ignition power state or an ignition power ON state, the transmission mode is a parking state, and the door state is an open state.

The processor may output the inadvertent ignition warning guiding the transmission mode to be switched to a parking state, when the power state is an ignition power state or an ignition power ON state, the transmission mode is a non-parking state, and the door state is an open state.

The vehicle may further include a display for displaying the inadvertent ignition warning message having an inadvertent ignition level display step and a color differentiated according to the inadvertent ignition level, according to the control of the processor.

The vehicle may further include an output unit configured to output the inadvertent ignition warning message having a voice level differentiated according to the inadvertent ignition level, in the form of voice, according to the control of the processor.

In accordance with another aspect of the present disclosure, a control method of a vehicle includes detecting a power state of the vehicle, a transmission mode, and a door state; generating an inadvertent ignition warning by comparing the power state of the vehicle, the transmission mode, and the door state with an inadvertent ignition reference; generating an inadvertent ignition level according to an accumulation of the generated inadvertent ignition warning; and outputting an inadvertent ignition warning message corresponding to the generated inadvertent ignition level.

The generation of the inadvertent ignition level may generate the inadvertent ignition level by applying a weight value corresponding to a cumulative number of the inadvertent ignition warnings.

The generation of the inadvertent ignition level may generate the inadvertent ignition level by applying a weight value corresponding to the type of the inadvertent ignition warning.

The generation of the inadvertent ignition level may decrease the inadvertent ignition level by applying a negative (−) weight value when the inadvertent ignition warning is not generated until the power state is switched to an ignition power OFF state after the power state is switched to an ignition power ON state.

The control method may further include comparing the generated inadvertent ignition level with a reference level between generating the inadvertent ignition level and outputting the inadvertent ignition warning message, wherein the output of the inadvertent ignition warning message may output the inadvertent ignition warning message including an inadvertent ignition pattern when the inadvertent ignition level exceeds the reference level according to the result of the comparison.

The generation of the inadvertent ignition warning by comparing the power state of the vehicle, the transmission mode, and the door state with an inadvertent ignition reference may output the inadvertent ignition warning guiding the transmission mode to be switched to a parking state when the power state is an accessory power state, the transmission mode is a non-parking state, and the door state is an open state.

The generation of the inadvertent ignition warning by comparing the power state of the vehicle, the transmission mode, and the door state with an inadvertent ignition reference may output the inadvertent ignition warning guiding the power state to be switched to an ignition power OFF state when the power state is an ignition power state or an ignition power ON state, the transmission mode is a parking state, and the door state is an open state.

The generation of the inadvertent ignition warning by comparing the power state of the vehicle, the transmission mode, and the door state with an inadvertent ignition reference may output the inadvertent ignition warning guiding the transmission mode to be switched to a parking state when the power state is an ignition power state or an ignition power ON state, the transmission mode is a non-parking state, and the door state is an open state.

The output of the inadvertent ignition warning message may display the inadvertent ignition warning message having an inadvertent ignition level display step and a color differentiated according to the inadvertent ignition level.

The output of the inadvertent ignition warning message may output the inadvertent ignition warning message having a voice level differentiated according to the inadvertent ignition level, in the form of voice.

BRIEF DESCRIPTION OF THE DRAWINGS

These and/or other aspects of the disclosure will become apparent and more readily appreciated from the following description of embodiments, taken in conjunction with the accompanying drawings of which:

FIG. 10 is a block diagram illustrating a method for generating an inadvertent ignition warning level of the inadvertent ignition warning service of FIG. 9.

DETAILED DESCRIPTION

Figure 1:
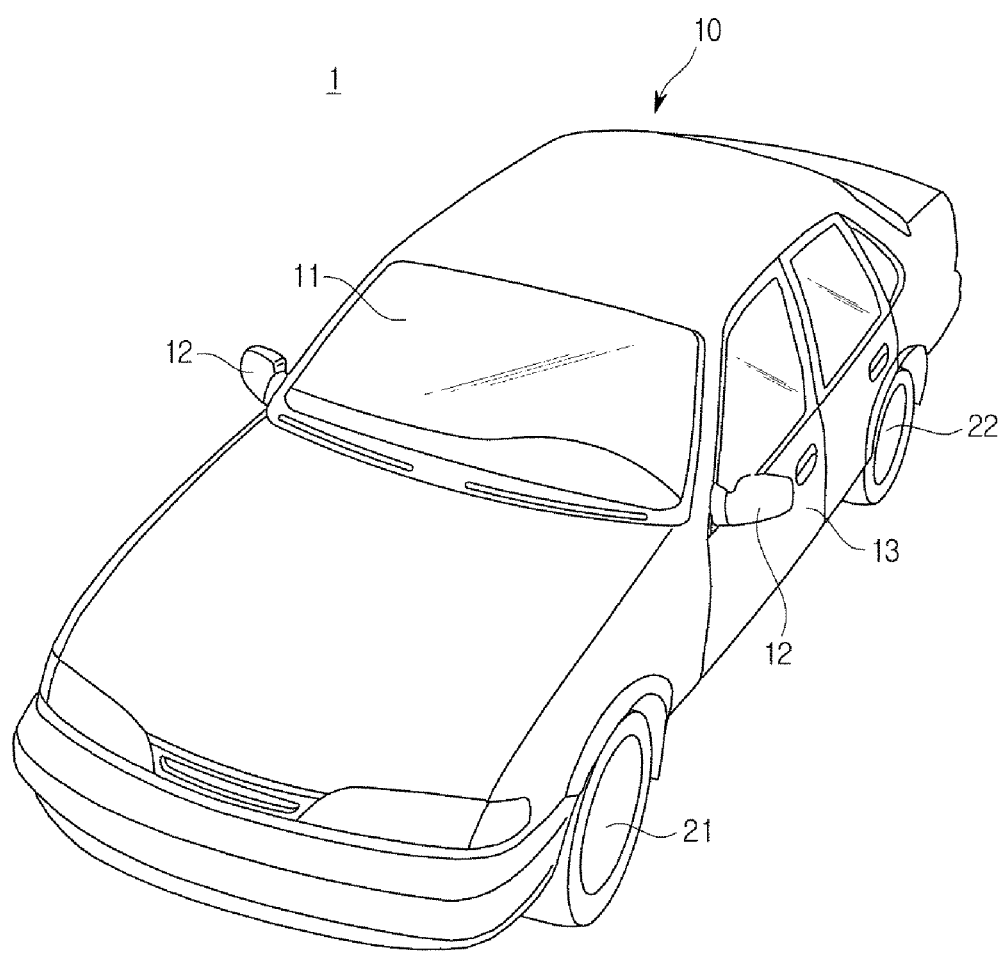
FIG. 1 is an exterior view illustrating a vehicle in accordance with an embodiment of the present disclosure.

The present disclosure will be described more fully hereinafter with reference to the accompanying drawings, in which exemplary embodiments of the present disclosure are shown. In case of adding a reference numeral to components of each drawing, it may be noted that the same component has the same reference numeral although shown in other drawing. Parts which are not associated with the description are omitted in order to specifically describe the present disclosure, and like reference numerals refer to like elements throughout the specification. If it is determined that a detailed description of commonly-used technologies or structures related to the embodiments of the present disclosure may unnecessarily obscure the subject matter of the present disclosure, the detailed description will be omitted. Further, in the following detailed description, names of components, which are in the same relationship, are divided into "the first", "the second", and the like, but the present disclosure is not limited to the order in the following description.

Figure 2:
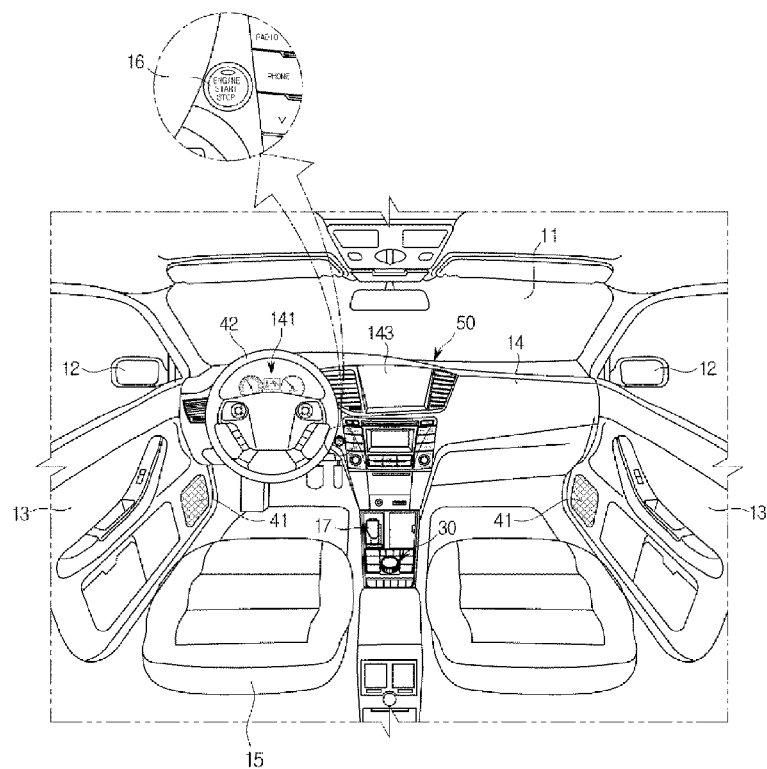
FIG. 2 is an interior view illustrating a vehicle in accordance with an embodiment of the present disclosure.

FIG. 1 is an exterior view illustrating a vehicle and FIG. 2 is an interior view illustrating a vehicle.

Referring to FIG. 1, an exterior of a vehicle 1 may include a body 10 forming an exterior of the vehicle 1, a windscreen 11 providing a front view of the vehicle 1 to a driver, a side mirror 12 providing a view of a rear side of the vehicle 1 to the driver, a door 13 for closing the inside of the vehicle 1 from the outside, and vehicle wheels 21 and 22 for moving the vehicle 1 including a front wheel 21 disposed on a front side of the vehicle and a rear wheel 22 disposed on a rear side of the vehicle.

The windscreen 11 may be provided on an upper portion of the front of the body 10 to allow a driver inside the vehicle 1 to acquire visual information about the front of the vehicle 1. The side mirror 12 may include a left side mirror provided on the left side of the body 10 and a right side mirror provided on the right side of the body 10, and may allow a driver inside the vehicle 1 to acquire visual information of the lateral side and the rear side of the vehicle 1.

The door 13 may be rotatably provided on a right side and a left side of the body 10. When the door 13 is opened, a driver may be allowed to enter the vehicle 1, and when the door 13 is closed, the inside of the vehicle 1 may be closed from the outside.

Referring to FIG. 2, the interior of the vehicle 1 may include a dashboard 14 in which a variety of devices are installed to allow a driver to operate the vehicle 1, a driver seat 15 in which the driver is seated, a display of a cluster 141 configured to display operation information of the vehicle 1, an Audio Video Navigation (AVN) device 50 configured to perform an audio function and a video function as well as a navigation function for guiding a driving route from a departure to a destination in response to an operation command of the driver.

The dashboard 14 may be protruded from a lower side of the windscreen 11 to the driver so that the driver may be allowed to operate a variety of devices installed in the dashboard 14 while watching the front.

The driver seat 15 may be provided in the rear side of the dashboard 14 so that the driver may drive the vehicle 1 in a stable position while watching the front side of the vehicle 1 and the variety of devices of the dashboard 14.

The display 140 of a cluster may be provided in the driver seat 15 of the dashboard 14 and provided with a speedometer indicating a driving speed of the vehicle 1 and an RMP gauge indicating a rotation speed of a driving device (not shown).

The display 140 of a cluster may display an inadvertent ignition warning message, and a description thereof will appear below.

An ignition button 16 may be configured to receive an input of a command to allow a driver to start an ignition, and according to a pressing order of a button, an electric control unit (not shown) connected to the ignition button 16 may generate a command of starting ignition in order, e.g. OFF->ACC->IG->OFF or OFF->ACC->IG->START.

"OFF" may represent an ignition power OFF state that is the vehicle is in a dormant mode, "ACC" may represent an accessory power state in which power of a battery is supplied to automotive electronics without the ignition of the engine, "IG" may represent an ignition power state, and "START" may represent an ignition power ON state.

The AVN device 50 may include a display 143 for displaying an audio, a video, and texts as well as road information related to a traveling road of the vehicle 1 or a route to a destination desired by a driver and a speaker 41 outputting a sound according to an operation command of the driver. In addition, the display 143 of the AVN device 50 may display an inadvertent ignition warning message, and a detailed description thereof will appear later.

The vehicle 1 may include a driver remote controller 30 provided adjacent to the driver seat 15 to operate the AVN device 50.

In addition to above mentioned components, the vehicle 1 may include a driving device (not shown) configured to rotate the wheels 21 and 22, a steering system (not shown) configured to change the driving direction of the vehicle 1, and a brake system (not shown) configured to stop the driving of the wheels 21 and 23.

The vehicle wheels 22 and 23 may include a front wheel 22 provided on a front of the vehicle and a rear wheel 23 provided on a rear of the vehicle. The driving device 16 may supply a torque to the front wheel 22 and/or the rear wheel 23 so that the body 10 may be moved back and forth. The driving device 16 may employ an engine configured to generate a torque by burning a fossil fuel or a motor configured to generate a torque by receiving power source from a capacitor (not shown).

The driving device may supply a torque to the front wheel 21 or the rear wheel 22 so that the body 10 may be moved back and forth. The driving device may include an engine configured to generate a torque by burning a fossil fuel or a motor configured to generate a torque by receiving power from a battery (not shown).

The steering system may include a steering wheel 42 for receiving a driving direction from a driver, a steering gear (not shown) changing a rotary motion of the steering wheel 42 to a reciprocating motion, and a steering link (not shown) delivering the reciprocating motion of the steering gear (not shown) to the front wheel 21. Accordingly, the steering system may change the driving direction of the vehicle 1 by changing the direction of the rotary axis of the wheels 21 and 22.

The brake system may include a brake pedal (not shown) receiving a brake operation from a driver, a brake drum, or brake disc, (not shown) coupled to the wheels 21 and 22, and a brake shoe, or caliper, (not shown) for stopping the rotation of the brake drum, or disc, (not shown) by using friction force. Accordingly, the brake system may stop the driving of the vehicle 1 by stopping the rotation of the wheels 21 and 22.

Figure 3:
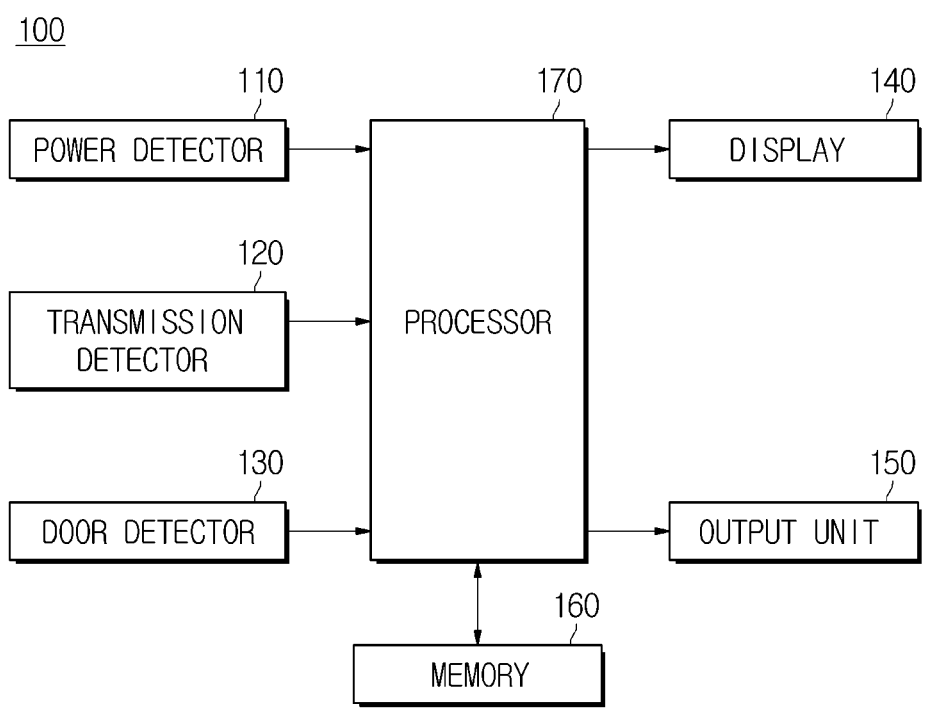
FIG. 3 is a control block diagram illustrating a configuration of a vehicle to provide an inadvertent ignition warning service.

FIG. 3 is a control block diagram illustrating a configuration of the vehicle to provide an inadvertent ignition warning service.

Figure 4:
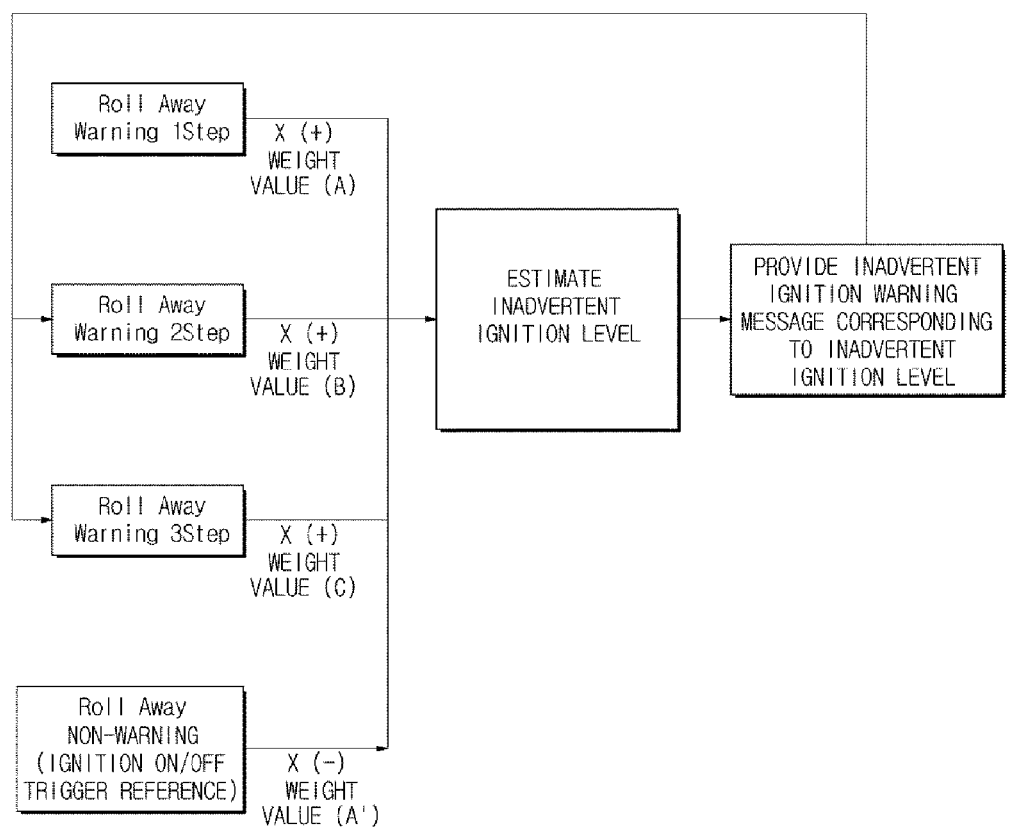
FIG. 4 is a view schematically illustrating a method to estimate an inadvertent ignition level.
Figure 5:
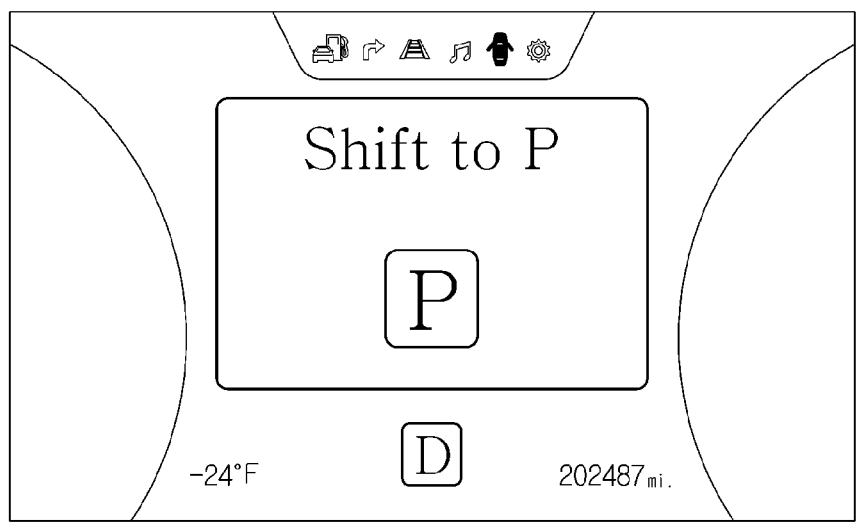
FIGS. 5 and 6 are views illustrating an example of an indication when an inadvertent ignition warning condition occurs.
Figure 6:
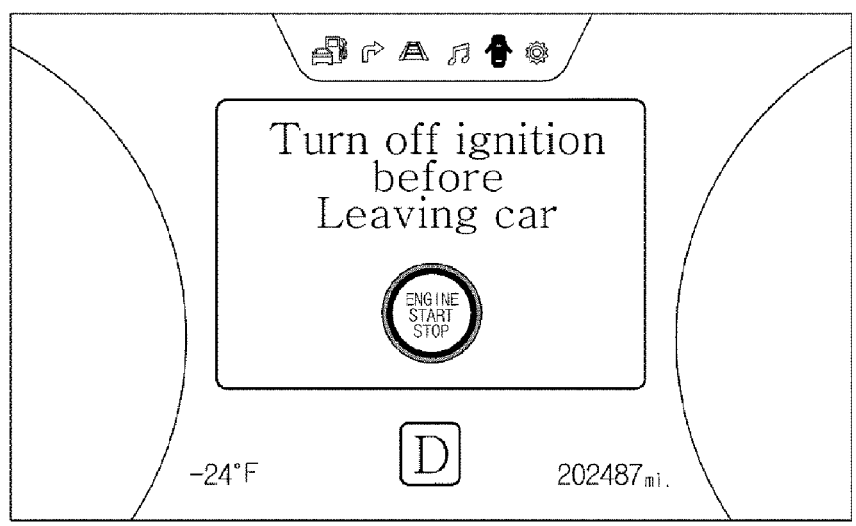
Figure 7:
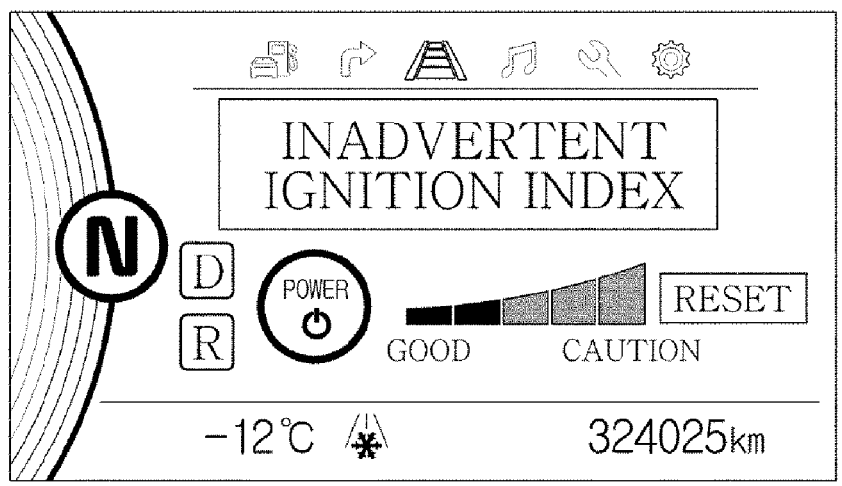
FIGS. 7 and 8 are views illustrating an example of a warning message corresponding to an inadvertent ignition warning level.
Figure 8:

Hereinafter an embodiment of the present disclosure will be described with reference to FIG. 4 illustrating a method to estimate an inadvertent ignition level, FIGS. 5 and 6 illustrating an example of an indication when an inadvertent ignition warning condition occurs, and FIGS. 7 and 8 illustrating an example of a warning message corresponding to an inadvertent ignition warning level.

Referring to FIG. 3, the vehicle 100 may include a power detector 110, a transmission detector 120, a door detector 130, a display 140, an output unit 150, a memory 160 and a processor 170.

The power detector 110 may be configured to detect a power state of the vehicle 100.

Particularly, the power detector 110 may detect a power state that is delivered via Controller Area Network (CAN) when a power transfer is performed by an operation of the ignition button 16 (or ignition key) of a driver. The power state may include an ignition power OFF state, wherein the vehicle is in a dormant mode, an ACC power state in which power of a battery is supplied to automotive electronics without the ignition of the engine, an ignition power state, and an ignition power ON state, but is not limited thereto.

The transmission detector 120 may be configured to detect a transmission mode. The transmission mode may include a parking state (P), a reverse state (R), a neutral state (N) and a driving state (D). The transmission detector 120 may detect a transmission mode delivered via the CAN communication according to the generation of transmission control signal by the operation of the transmission lever (17 of FIG. 2) of the driver.

The door detector 130 may be configured to detect a door state of the vehicle 100. The door detector 130 may detect an open state or a close state of the door.

The processor 170 may generate an inadvertent ignition warning by comparing the power state, the transmission mode, and the door state with an inadvertent ignition reference, may generate an inadvertent ignition level according to an accumulation of the generated inadvertent ignition warning, and may provide an inadvertent ignition warning message corresponding to the generated inadvertent ignition level. The processor 170 may provide the inadvertent ignition warning message via the display 140 and the output unit 150.

The inadvertent ignition reference may represent a reference to determine the driver's operation error related to the ignition in a state in which the vehicle 100 is in a roll away state that is the vehicle 100 is movable.

Particularly, when the power state is an accessary power state, the transmission mode is a non-parking state, and the door state is an open state, the processor 170 may output an inadvertent ignition warning (refer to FIG. 5) guiding the transmission mode to be switched to a parking state. The processor 170 may output the inadvertent ignition warning via the display 140 or the output unit 150.

When the power state is an ignition power state or an ignition power ON state, the transmission mode is a parking state, and the door state is an open state, the processor 170 may output an inadvertent ignition warning (refer to FIG. 6) guiding the power state to be switched to an ignition power OFF state.

When the power state is an ignition power state or an ignition power ON state, the transmission mode is a non-parking state, and the door state is an open state, the processor 170 may output an inadvertent ignition warning (refer to FIG. 5) guiding the transmission mode to be switched to a parking state.

Meanwhile, the processor 170 may generate an inadvertent ignition level by applying a weight value corresponding to the cumulative number of inadvertent ignition warnings.

Referring to FIG. 4, when the processor 170 recognizes an inadvertent ignition warning (refer to Roll Away Warning of FIG. 4) that is generated when the vehicle is in a movable state (roll away state), the processor 170 may estimate an inadvertent ignition level that is calculated by integrating an inadvertent ignition warning by applying a various weight value (+A, +B, +C) according to the cumulative number of recognized inadvertent ignition warnings (1 step, 2 step, 3 step). For this, the processor 170 may check the number of generated inadvertent ignition warnings by storing and managing the generated inadvertent ignition warning in the memory 160 by feed-backing the generated inadvertent ignition warning.

That is, the processor 170 may estimate an inadvertent ignition level using Formula 1 when the inadvertent ignition warning is generated.

Inadvertent ignition level=previous inadvertent ignition level+(inadvertent ignition warning×weight value corresponding to the cumulative number of inadvertent ignition warnings)   Formula 1:

In addition, the processor 170 may decrease an inadvertent ignition level by applying a negative (−) weight value when an inadvertent ignition warning is not generated until the ignition power state is switched to OFF after the ignition power state, which is detected by the power detector 110, is switched to ON. Referring to FIG. 4, the processor 170 may estimate an inadvertent ignition level by applying a weight value −A' when an inadvertent ignition warning is not generated with respect to an ignition power ON/OFF trigger reference.

That is, the processor 170 may estimate an inadvertent ignition level using Formula 2 when the inadvertent ignition warning is not generated.

Inadvertent ignition level=previous inadvertent ignition level+(inadvertent ignition non-warning× weight value of inadvertent ignition non-warning)   Formula 2:

In addition, the processor 170 may generate an inadvertent ignition level by applying a weight value corresponding to the type of inadvertent ignition warning. Particularly, the processor 170 may set a higher weight value applied to an inadvertent ignition warning, as a state, which is recognized based on the vehicle power state, the transmission mode, and the door state, when the state is related to more adverse situation. Accordingly, the processor 170 may apply the high weight value to the inadvertent ignition warning message provide to the driver.

The processor 170 may initialize the number of inadvertent ignition warning stored in the memory 160 in response to an inadvertent ignition warning reset signal input from a user. For this, a reset selection menu (refer to FIGS. 7 and 8) for selection to allow the number of inadvertent ignition warnings to be initialized may be displayed in the inadvertent ignition warning message. The menu for reset of the inadvertent ignition warning may be displayed on the display 140 in a pop-up manner, but is not limited thereto. The menu may be implemented to allow the corresponding item to be searched according user's need.

Referring to FIG. 8, when the inadvertent ignition level exceeds a reference level, the processor 170 may output an ignition warning message including an inadvertent ignition pattern.

For example, the processor 170 may display the number of generations of inadvertent ignition warnings corresponding to the type of inadvertent ignition warning through an inadvertent ignition pattern general warning guidance illustrated in FIG. 8, but is not limited thereto. A variety of methods may be applied to guide an inadvertent ignition pattern to a driver.

According to the control of the processor 170, the display 140 may display the inadvertent ignition warning message having an inadvertent ignition level display step and a color differentiated according to the inadvertent ignition level.

The display 140 may include the display 140 of the cluster and the display 143 of the AVN device. In order to allow a driver to check the inadvertent ignition warning message easily, the inadvertent ignition warning message may be displayed on any one of the display 140 of the cluster and the display 143 of the AVN device, or both of the display 140 of the cluster and the display 143 of the AVN device.

When the display 140 is a liquid crystal display (LCD) user interface (UI) configured to display an icon and a text, the inadvertent ignition warning message may be displayed by using an icon and a text so that a driver easily confirms the message. When the display 140 is alight emitting diode (LED) user interface (UI), the inadvertent ignition warning message may be displayed by lighting or flashing so that a driver easily confirms the message.

In addition, the display 140 may include at least one of a liquid crystal display, thin film transistor-liquid crystal display, organic light-emitting diode, flexible display, and 3D display.

Referring to FIG. 7, the display 140 may display a color on a bar graph according to the inadvertent ignition level, wherein the bar graph indicates the inadvertent ignition index from a good stage to a caution stage so that a driver easily confirms the inadvertent ignition level. Each bar of the bar graph may be filled with the same color or various color according the stages.

According to the control of the processor 170, the output unit 150 may output an inadvertent ignition warning message having a voice level differentiated according to the inadvertent ignition level, in the form of voice.

The output unit 150 may more repeatedly output the inadvertent ignition warning message or output the inadvertent ignition warning message with a short interval between outputting the inadvertent ignition warning message, as the inadvertent ignition level is high, so as to increase the recognition of the inadvertent ignition warning message for the driver.

Further, the output unit 150 may further include a Digital-to-Analog Convertor (DAC) configured to convert a digital electrical signal into an analog electrical signal, and an amplifier configured to amplify the analog electrical signal by the DAC.

Figure 9:
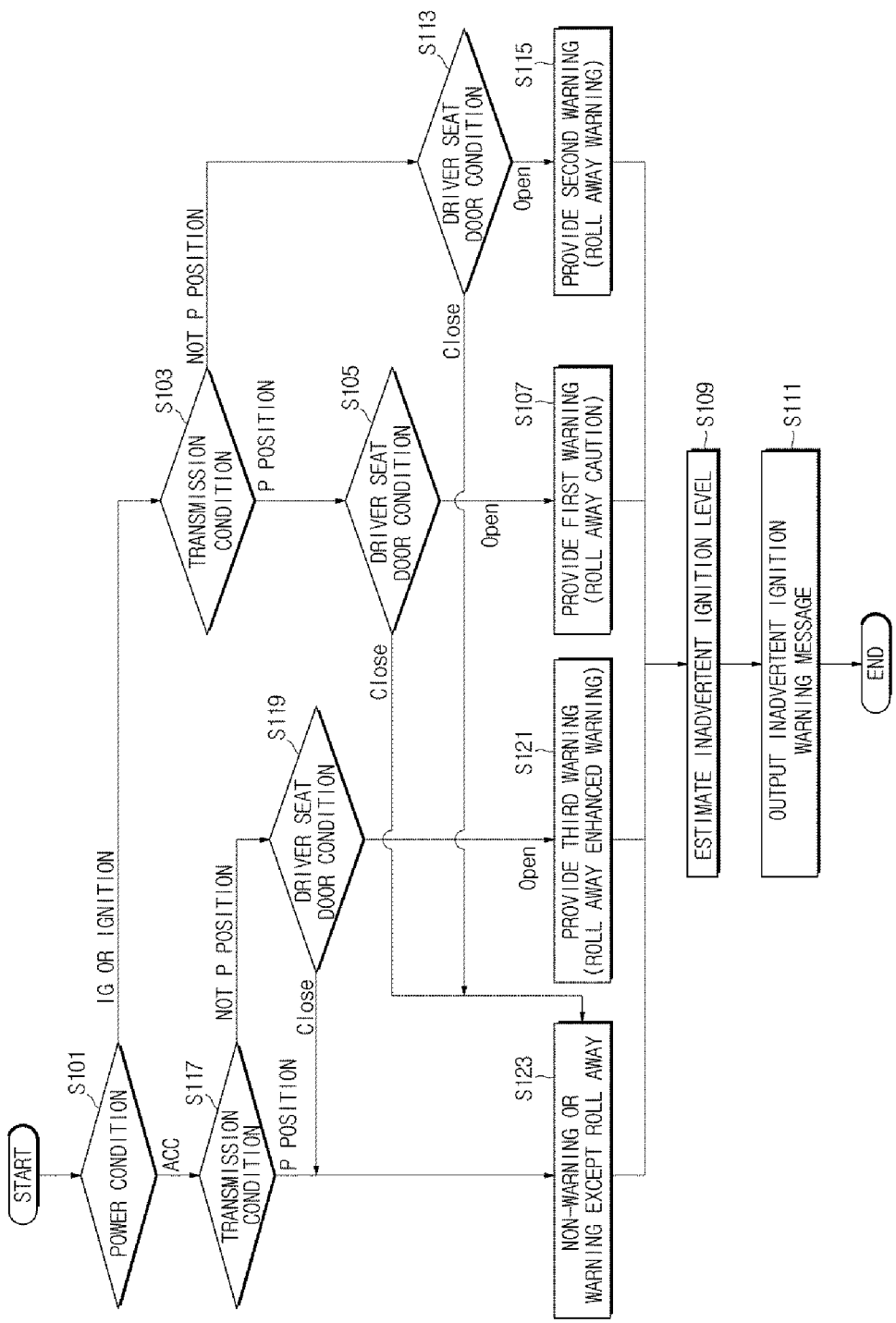
FIG. 9 is a flow chart illustrating a control method of a vehicle to provide an inadvertent ignition warning service.

FIG. 9 is a flow chart illustrating a control method of the vehicle to provide an inadvertent ignition warning service.

Referring to FIG. 9, the vehicle 100 may detect the vehicle power state, the transmission mode, and the door state (S101, S103, S105, S113, S117 and S119). The vehicle 100 may generate an inadvertent ignition warning by comparing the vehicle power state, the transmission mode, and the door state with an inadvertent ignition reference (S107, S115, S121 and S123). The vehicle 100 may generate an inadvertent ignition level according to the accumulation of the generated inadvertent ignition warning (S109). The vehicle 100 may output an inadvertent ignition warning message corresponding to the generated inadvertent ignition level (S111).

To describe the above-mentioned steps in detail, the vehicle 100 may detect a power state through the power detector 110 (S101).

According to the result of the detection, when the power state is an ignition power state or an ignition power ON state, the vehicle 100 may confirm whether the transmission mode is a parking state through the transmission detector 120 (S 103).

According to the result of the confirmation, when the transmission mode is a parking state, the vehicle 100 may confirm whether the door state is an open state through the door detector 130 (S 105). In this case, the door state may represent detecting the driver seat door state, but is not limited thereto.

According to the result of the confirmation, when the door state is an open door state, the vehicle 100 may output an inadvertent ignition warning guiding the power state to be switched to the ignition power OFF state through the display 140 and the output unit 150 (S 107).

The vehicle 100 may generate an inadvertent ignition level based on the generated inadvertent ignition warning (S 109).

The vehicle 100 may generate the inadvertent ignition level by applying a weight value corresponding to the cumulative number of the inadvertent ignition warnings. For this, the vehicle 100 may store and manage the generated inadvertent ignition warning information in the memory 160.

The vehicle 100 may generate the inadvertent ignition level by applying a weight value corresponding to the type of inadvertent ignition warning.

The vehicle 100 may decrease an inadvertent ignition level by applying a negative (−) weight value when an inadvertent ignition warning is not generated until the power state is switched to an ignition power OFF state after the power state is switched to an ignition power ON state.

The vehicle 100 may output an inadvertent ignition warning message differentiated according to the inadvertent ignition level (S 111).

In S 111, the vehicle 100 may display an inadvertent ignition warning message having an inadvertent ignition level display step and color differentiated according to the inadvertent ignition level.

The vehicle 100 may output an inadvertent ignition warning message having a voice level differentiated according to the inadvertent ignition level, in a voice manner.

The above-mentioned inadvertent ignition warning message may be output in the type in which the ignition level display and color are differentiated, or in the voice type, simultaneously or selectively.

Although not shown, between generating the inadvertent ignition level (S 109) and outputting the inadvertent ignition warning message (S 111), the vehicle 100 may compare the generated inadvertent ignition level with a reference level. At this time, the reference level may represent an inadvertent ignition level, which may need to be more emphasized, in comparison with the previous message since the cumulative number of the inadvertent ignition warnings exceeds the reference number, and may be randomly set by a user.

According to the result of the comparison, when the inadvertent ignition level exceeds the reference level, the vehicle 100 may output an inadvertent ignition warning message including an inadvertent ignition pattern (refer to FIG. 8) at the output of the inadvertent ignition warning message of S 111.

The result of the detection of S 103, when the transmission mode is the non-parking state, the vehicle 100 may confirm whether the door state is an open state through the door detector 130 (S 113).

According to the result of the confirmation, when the door state is the open state, the vehicle 100 may output an inadvertent ignition warning (refer to FIG. 5), which is configured to guide the transmission state to be switched to the parking state (S 115).

The vehicle 100 may proceed with S 109 by applying the inadvertent ignition warning of S 115.

On the other hand, according the result of the detection of S 101, when the power state is the accessory power state (ACC power state), the vehicle 100 may confirm whether the transmission mode is the parking state trough the transmission detector 120 (S 117).

According to the result of the detection, when the transmission mode is the non-parking state, the vehicle 100 may confirm whether the door state is the open state through the door detector 130 (S 119).

According to the result of the confirmation, when the door state is the open state, the vehicle 100 may output an inadvertent ignition warning (refer to FIG. 5) guiding the transmission mode to be switched to the parking state (S 121).

On the other hand, according to the result of the confirmation of S 117, when the transmission mode is the parking state, the vehicle 100 may not output an inadvertent ignition warning (S 123), and may proceed with S 109.

Further, according to the result of the confirmation of S 105, S 113 and S 119, when the door state is the close state, the vehicle 100 may not output an inadvertent ignition warning (S 123), and may proceed with S 109.

In a state of proceeding with S 109 by passing through S 123, when estimating an inadvertent ignition level, the vehicle 100 may allow an inadvertent ignition level to be lower than a previous level by applying a negative (−) weight value to an item in which an inadvertent ignition warning is not generated in S 123. This is in order to improve the reliability of the result of the inadvertent ignition level and to relieve the inconvenience of the driver caused by unnecessary inadvertent ignition warning message guidance, such as when the driver does not generate an inadvertent ignition.

FIG. 10 is a block diagram illustrating a method for generating an inadvertent ignition warning level of FIG. 9.

When receiving the generated inadvertent ignition warning (Roll Away Warning 1 step Flag 1=0 or 1, Roll Away Warning 2 step Flag 2=0 or 1, Roll Away Warning 3 step Flag 3=0 or 1, Roll Away non-warning Flag 4=0 or 1, as illustrated in FIG. 10) (S 201), the vehicle 100 may generate an inadvertent ignition level by applying a weight value according to the received cumulative number of the inadvertent ignition warnings (S 203).

Particularly, the vehicle 100 may estimate an inadvertent ignition level using Formula 1 when the inadvertent ignition warning is generated.

Inadvertent ignition level=previous inadvertent ignition level+(inadvertent ignition warning×weight value corresponding to the cumulative number of inadvertent ignition warnings)  Formula 1:

In addition, the vehicle 100 may estimate an inadvertent ignition level using Formula 2 when the inadvertent ignition warning is not generated.

Inadvertent ignition level=previous inadvertent ignition level+(inadvertent ignition non-warning× weight value of inadvertent ignition non-warning)  Formula 2:

The vehicle 100 may update an inadvertent ignition level display value based on the generated inadvertent ignition level (S 205), calculate an inadvertent ignition level display step and display a color displayed on the display 140 based on the updated inadvertent ignition level display value, and calculate a warning sound level to be output through the output unit 150 (S 207). At this time, the inadvertent ignition level display step may represent a step of filling each bar with a color according to the inadvertent ignition level wherein the bar graph of FIG. 7 indicates from a good step to a caution step.

The vehicle 100 may output an inadvertent ignition warning message in which the type of the display and the voice are differentiated according to the inadvertent ignition level in S 207, through the display 140 and the output unit 150 (S 209).

As is apparent from the above description, according to the proposed vehicle and control method thereof, the driver's inadvertent ignition may be prevented in advance since an inadvertent ignition warning level may be estimated by integrally managing the accumulation of the inadvertent ignition warning generated in the vehicle, and an inadvertent ignition warning message differentiated according to the estimated inadvertent ignition warning level may be provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a power detector for detecting a power state of the vehicle;
   a transmission detector for detecting a transmission mode of the vehicle;
   a door detector for detecting a door state of the vehicle; and
   a processor for generating an inadvertent ignition warning by comparing the power state, the transmission mode and the door state with an inadvertent ignition reference, for generating an inadvertent ignition level according to the accumulation of the generated inadvertent ignition warning, and for providing an inadvertent ignition warning message corresponding to the generated inadvertent ignition level,
   wherein the processor generates the inadvertent ignition level by applying a weight value corresponding to a cumulative number of the inadvertent ignition warnings or applying a weight value corresponding to the type of the inadvertent ignition warning.

2. The vehicle of claim 1, wherein the processor decreases an inadvertent ignition level by applying a negative (−) weight value when an inadvertent ignition warning is not generated until an ignition power state is switched to OFF after an ignition power state detected by the power detector is switched to ON.

3. The vehicle of claim 1, wherein the processor outputs the inadvertent ignition warning message including an inadvertent ignition pattern when the inadvertent ignition level exceeds a reference level.

4. The vehicle of claim 1, wherein the processor outputs the inadvertent ignition warning guiding the transmission mode to be switched to a parking state when the power state is an accessory power state, the transmission mode is a non-parking state and the door state is an open state.

5. The vehicle of claim 1, wherein the processor outputs the inadvertent ignition warning guiding the power state to be switched to an ignition power OFF state when the power state is an ignition power state or an ignition power ON state, the transmission mode is a parking state and the door state is an open state.

6. The vehicle of claim 1, wherein the processor outputs the inadvertent ignition warning guiding the transmission mode to be switched to a parking state when the power state is an ignition power state or an ignition power ON state, the transmission mode is a non-parking state and the door state is an open state.

7. The vehicle of claim 1, further comprising a display configured to display the inadvertent ignition warning message having an inadvertent ignition level display step and a color differentiated according to the inadvertent ignition level, according to the control of the processor.

8. The vehicle of claim 1, further comprising an output unit configured to output the inadvertent ignition warning message having a voice level differentiated according to the inadvertent ignition level, in the form of voice, according to the control of the processor.

9. A control method of a vehicle comprising:
   detecting a power state of the vehicle, a transmission mode and a door state;
   generating an inadvertent ignition warning by comparing the power state of the vehicle, the transmission mode and the door state with an inadvertent ignition reference;
   generating an inadvertent ignition level according to an accumulation of the generated inadvertent ignition warning; and
   outputting an inadvertent ignition warning message corresponding to the generated inadvertent ignition level.

10. The control method of claim 9, wherein the generation of the inadvertent ignition level generates the inadvertent ignition level by applying a weight value corresponding to a cumulative number of the inadvertent ignition warnings.

11. The control method of claim 9, wherein the generation of the inadvertent ignition level generates the inadvertent ignition level by applying a weight value corresponding to the type of the inadvertent ignition warning.

12. The control method of claim 9, wherein the generation of the inadvertent ignition level decreases the inadvertent ignition level by applying a negative (−) weight value when the inadvertent ignition warning is not generated until the power state is switched to an ignition power OFF state after the power state is switched to an ignition power ON state.

13. The control method of claim 9, further comprising comparing the generated inadvertent ignition level with a reference level between generating the inadvertent ignition level and outputting the inadvertent ignition warning message, wherein the output of the inadvertent ignition warning message outputs the inadvertent ignition warning message including an inadvertent ignition pattern when the inadvertent ignition level exceeds the reference level according to the result of the comparison.

14. The control method of claim 9, wherein the generation of the inadvertent ignition warning by comparing the power state of the vehicle, the transmission mode and the door state with an inadvertent ignition reference outputs the inadvertent ignition warning guiding the transmission mode to be switched to a parking state when the power state is an accessory power state, the transmission mode is a non-parking state and the door state is an open state.

15. The control method of claim 9, wherein the generation of the inadvertent ignition warning by comparing the power state of the vehicle, the transmission mode and the door state with an inadvertent ignition reference outputs the inadvertent ignition warning guiding the power state to be switched to an ignition power OFF state when the power state is an ignition power state or an ignition power ON state, the transmission mode is a parking state and the door state is an open state.

16. The control method of claim 9, wherein the generation of the inadvertent ignition warning by comparing the power state of the vehicle, the transmission mode and the door state with an inadvertent ignition reference outputs the inadvertent ignition warning guiding the transmission mode to be switched to a parking state when the power state is an ignition power state or an ignition power ON state, the transmission mode is a non-parking state and the door state is an open state.

17. The control method of claim 9, wherein the output of the inadvertent ignition warning message displays the inadvertent ignition warning message having an inadvertent ignition level display step and a color differentiated according to the inadvertent ignition level.

18. The control method of claim 9, wherein the output of the inadvertent ignition warning message outputs the inadvertent ignition warning message having a voice level differentiated according to the inadvertent ignition level, in the form of voice.

* * * * *